United States Patent [19]
Tsukiana et al.

[11] Patent Number: 6,032,620
[45] Date of Patent: Mar. 7, 2000

[54] AIR INTAKE STRUCTURE IN A CONSTRUCTION MACHINE

[75] Inventors: Takashi Tsukiana; Kazuyuki Saki; Hiroaki Iwamitsu; Koichi Yamashita; Keiji Fujioka, all of Hiroshima, Japan

[73] Assignee: Kabushiki Kaisha Kobe Seiko Sho, Kobe, Japan

[21] Appl. No.: 09/181,923

[22] Filed: Oct. 29, 1998

[30] Foreign Application Priority Data

Oct. 31, 1997 [JP] Japan .................................... 9-316173

[51] Int. Cl.⁷ ........................... F02M 35/04; F01P 11/10
[52] U.S. Cl. ........................... 123/41.48; 123/198 E
[58] Field of Search ........................... 123/41.48, 41.49, 123/198 E; 180/68.1, 68.3

[56] References Cited

U.S. PATENT DOCUMENTS 4,454,926  6/1984  Akins ........................................ 180/68.1

*Primary Examiner*—Andrew M. Dolinar
*Attorney, Agent, or Firm*—Oblon, Spivak, McClelland, Maier & Nerustadt, P.C.

[57] ABSTRACT

An air intake structure in a construction machine, comprising a radiator chamber, a radiator ventilating hole formed in an upper position of the radiator chamber, an air cleaner chamber formed in close proximity to the radiator chamber, an air cleaner ventilating hole formed in the ceiling surface of the air cleaner chamber, an intake duct disposed below the air cleaner ventilating hole and communicating with the radiator chamber, and an air cleaner disposed in close proximity to the ceiling surface of the air cleaner chamber at a position close to the intake duct. According to this air intake structure, not only the engine cooling efficiency can be enhanced to a satisfactory extent, but also a lower space in the air cleaner chamber can be fully utilized effectively.

6 Claims, 8 Drawing Sheets

AIR INTAKE STRUCTURE IN A CONSTRUCTION MACHINE

BACKGROUND OF THE INVENTION

1. Field of the Invention

The present invention relates to an air intake structure for introducing the outside air into a radiator for cooling an engine mounted on a construction machine such as a hydraulic excavator or on a working vehicle and also into an air cleaner for the engine.

2. Description of the Related Art

According to a conventional air intake structure mounted in a construction machine such as a hydraulic excavator, an air cleaner is attached to a lower surface of a partition plate which partitions between an air cleaner chamber and an intake duct. In this conventional structure, the air cleaner is located at a fairly lower position than the ceiling surface in the air cleaner chamber, thus giving rise to a problem that the lower space in the air cleaner chamber is not fully utilized effectively. Further, the mounting structure for mounting the air cleaner to the lower surface of the partition plate involves a problem in point of strength.

In a certain conventional air intake structure, an intake port to a radiator chamber and an intake port to an air cleaner chamber are formed separately. According to this conventional structure, a problem is encountered such that the engine cooling efficiency cannot be enhanced to a sufficient extent because the opening for the intake of air into the radiator chamber is not large.

SUMMARY OF THE INVENTION

It is an object of the present invention to provide an air intake structure in a construction machine which air intake structure is capable of introducing a sufficient amount of outside air into a radiator chamber, thereby enhancing the engine cooling efficiency to a satisfactory extent, and fully utilizing a lower space in an air cleaner chamber effectively and which is simple in structure and has a high strength.

The air intake structure of the present invention includes a radiator chamber, a radiator ventilating hole formed in an upper position of the radiator chamber, an air cleaner chamber formed in close proximity to the radiator chamber, an air cleaner ventilating hole formed in the ceiling surface of the air cleaner chamber, an intake duct disposed below the air cleaner ventilating hole and communicating with the radiator chamber, and an air cleaner which is disposed in close proximity to the ceiling surface of the air cleaner chamber at a position close to the intake duct and which introduces therein the outside air through an intake port formed in the intake duct.

According to this intake structure, the outside air which has been introduced through the air cleaner ventilating hole is sucked into both air cleaner and radiator chamber through the intake duct. Thus, the radiator chamber is provided with large intake openings which are an opening communicating with the air cleaner ventilating hole and the radiator ventilating hole formed in an upper position of the radiator chamber, so that the engine cooling efficiency can be enhanced to a satisfactory extent. Besides, since the air cleaner is located in close proximity to the ceiling surface of the air cleaner chamber and at a position close to the intake duct, it is possible to fully utilize a lower space in the air cleaner chamber effectively.

In the interior of the intake duct, a shielding plate may be disposed above the suction port, whereby not only it is possible to prevent rain water or the like from being sucked into the air cleaner through the air cleaner ventilating hole, but also it is possible to reduce an intake noise of air which is sucked in from the intake port of the air cleaner.

An intake box which is formed in a box shape opened substantially on its lower side alone and which surrounds the intake port in the interior of the intake duct, may be provided so that the air cleaner sucks therein the outside air through the intake duct, intake box and intake port. In this case, rain water or the like can be prevented more positively from being sucked into the intake port of the air cleaner. This is also the case with a slanting rain.

Further, the air cleaner may be fixed to a guard member which forms not only the ceiling surface of the air cleaner chamber but also an outer facing of a construction machine, or to a support member for supporting the guard member. In this case, the air cleaner can be fixed securely and strongly at an upper position of the air cleaner chamber.

DESCRIPTION OF THE PREFERRED EMBODIMENT

An air intake structure according to an embodiment of the present invention will be described hereinunder with reference to FIGS. 1 to 8.

Figure 1:
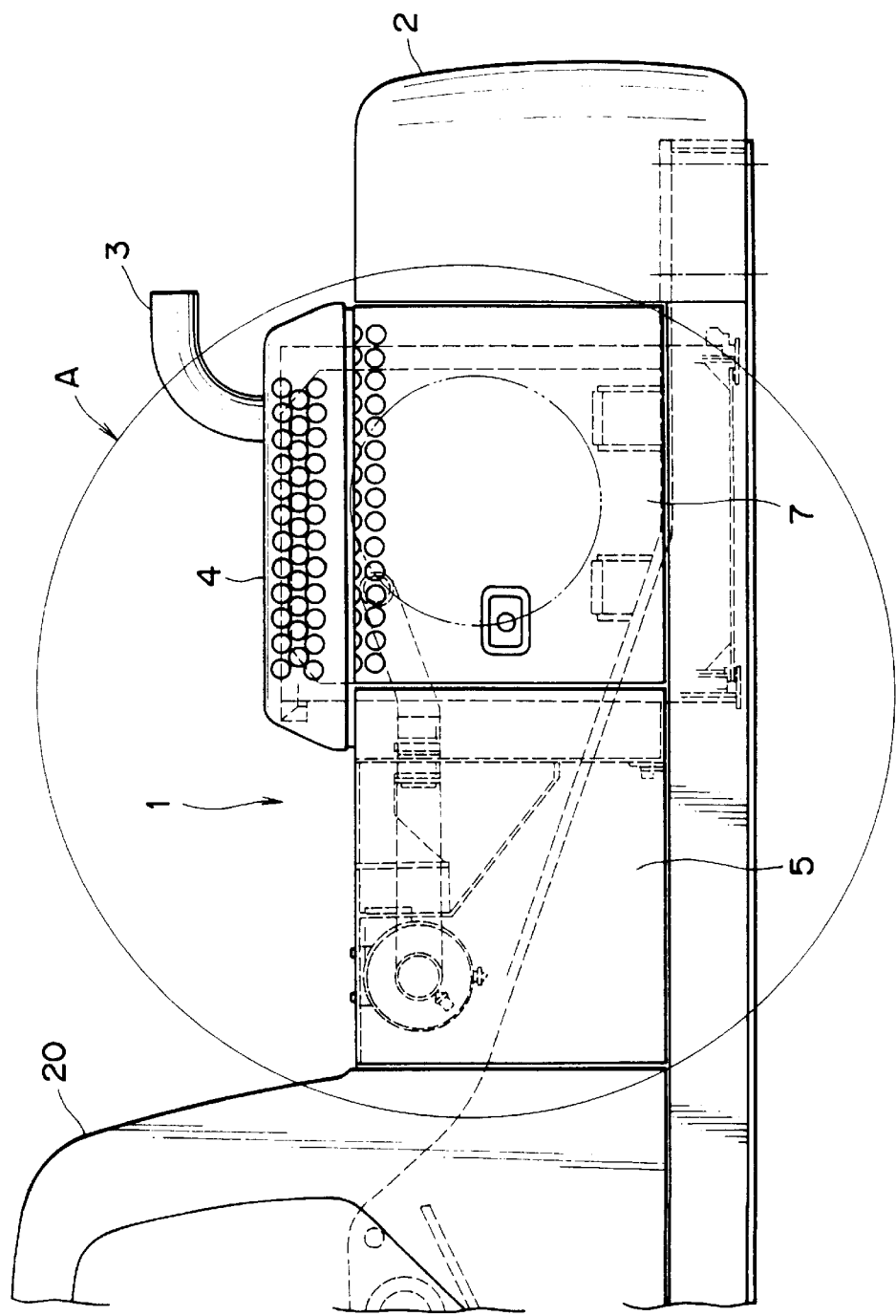
FIG. 1 is a side view of a principal portion of a hydraulic excavator equipped with an air intake structure according to an embodiment of the present invention.

FIG. 1 is a side view of a principal portion of a hydraulic excavator equipped with the air intake structure embodying the invention (as to the whole of the hydraulic excavator, it is now shown). In the same figure, the reference numeral 1 denotes a rotating body of the hydraulic excavator. Numeral 2 denotes a counter weight mounted in the rear portion of the rotating body 1. Numeral 3 denotes an exhaust gas pipe of a muffler. Numeral 4 denotes an engine bonnet. Numeral 5 denotes a front left side guard plate. Numeral 7 denotes a rear left side guard plate. Numeral 20 denotes a driver's cabin.

Figure 2:
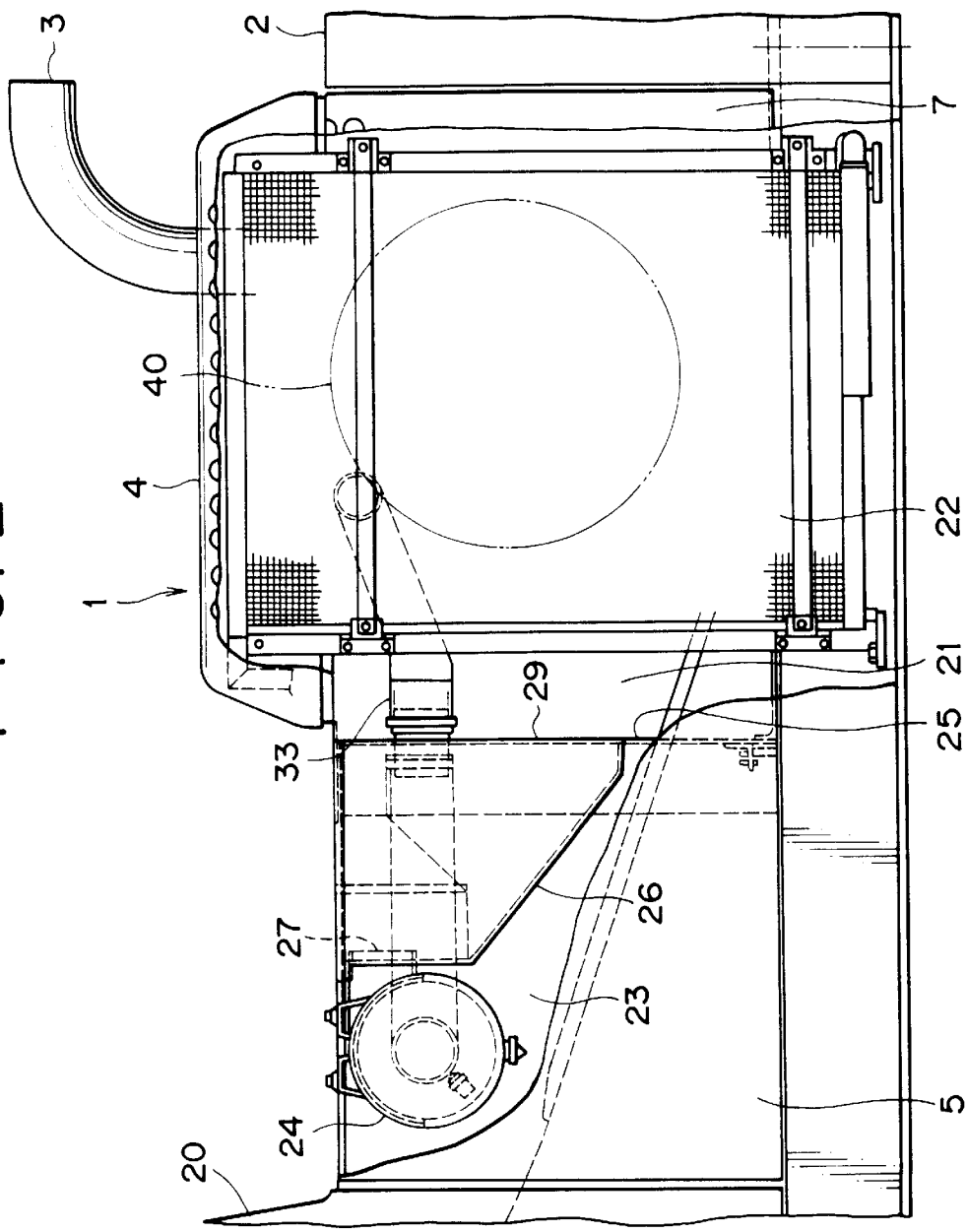
FIG. 2 is a cut-out view of portion A in FIG. 1.

FIG. 2 is a cut-out view of portion A in FIG. 1. In the same figure, numeral 21 denotes a radiator chamber. Numeral 22 denotes an oil cooler for cooling a hydraulic oil, the oil cooler 22 being disposed on this side in the figure in parallel with a radiator within the radiator chamber 21. Numeral 23 denotes an air cleaner chamber with an air leaner 24 disposed therein. Numeral 25 denotes a partition plate disposed between the air cleaner chamber 23 and the radiator chamber 21. Numeral 26 denotes an intake duct. Numeral 27 denotes an intake port through which air is sucked into the air cleaner 24. Numeral 29 denotes a ventilating hole formed in the partition plate 25. Numeral 33 denotes an intake pipe for an engine through which air is introduced into the engine 40 after being filtered by the air cleaner 24.

Figure 3:
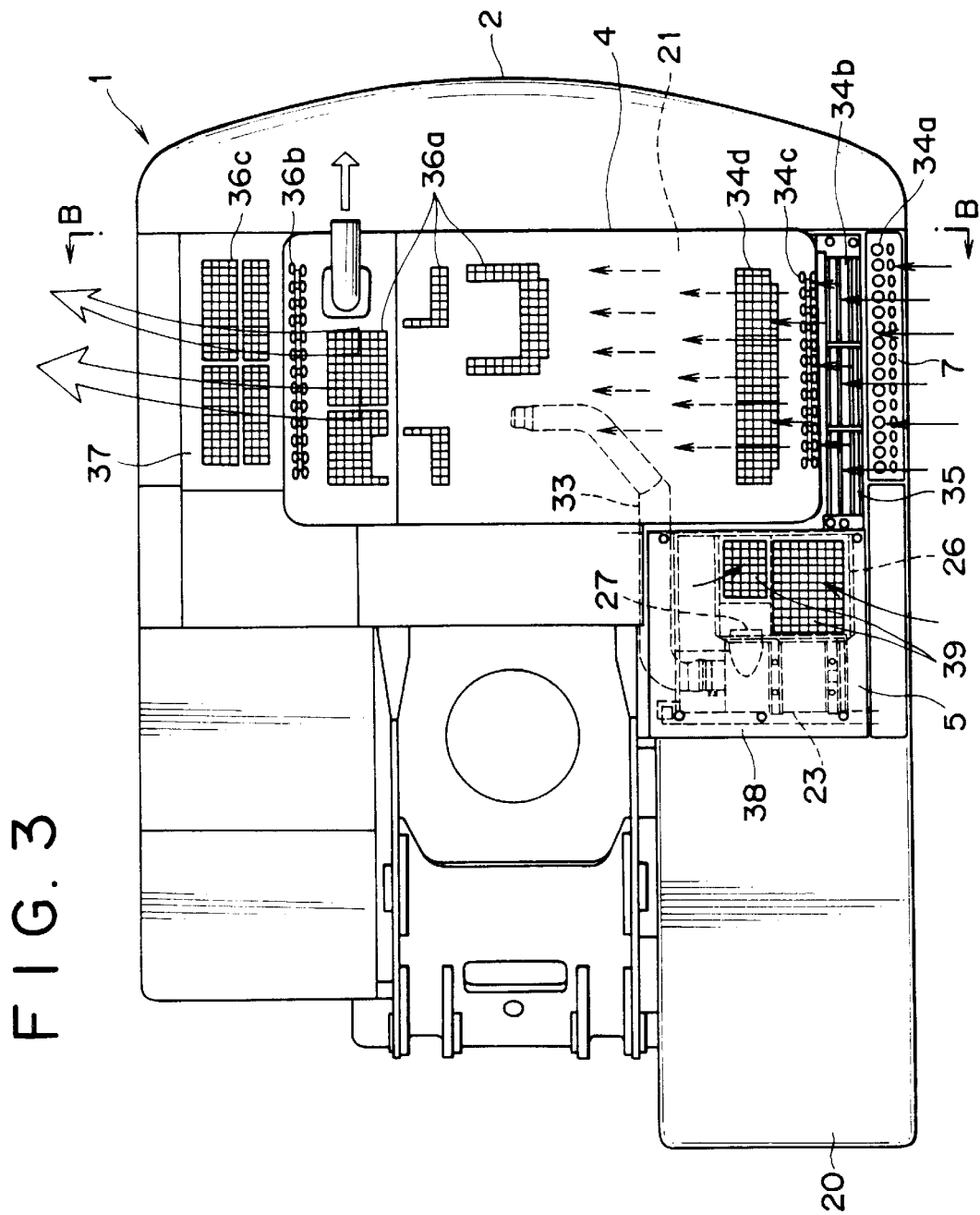
FIG. 3 is a plan view of a rotating body shown in FIG. 1.

FIG. 3 is a plan view of the rotating body 1 shown in FIG. 1. In FIG. 3, numeral 34a denotes a radiator ventilating hole formed in an upper position of the rear left side guard plate 7 to introduce the outside air directly into the radiator chamber 21. Numeral 34b denotes a radiator ventilating hole formed in a rear left upper guard plate 35 to introduce the outside air directly into the radiator chamber 21. Numerals 34c and 34d denote radiator ventilating holes formed respectively in the left side portion and left upper portion of the engine bonnet 4 to introduce the outside air directly into the radiator chamber 21. Numerals 36a and 36b denote exhaust holes formed respectively in the light upper portion and right side portion of the engine bonnet 4 to discharge to the exterior of the machine a high-temperature air after passing through the radiator chamber 21 and hence after cooling. Numeral 36c denotes an exhaust hole formed in a rear light upper guard plate 37 to discharge to the exterior of the machine a high-temperature air after passing through the radiator chamber 21 and hence after cooling. Numeral 38 denotes a guard plate which constitutes an upper surface of the air cleaner chamber 23. Numeral 39 denotes an air cleaner ventilating hole formed in the guard plate 38 on the upper surface side of the intake duct 26.

Figure 4:
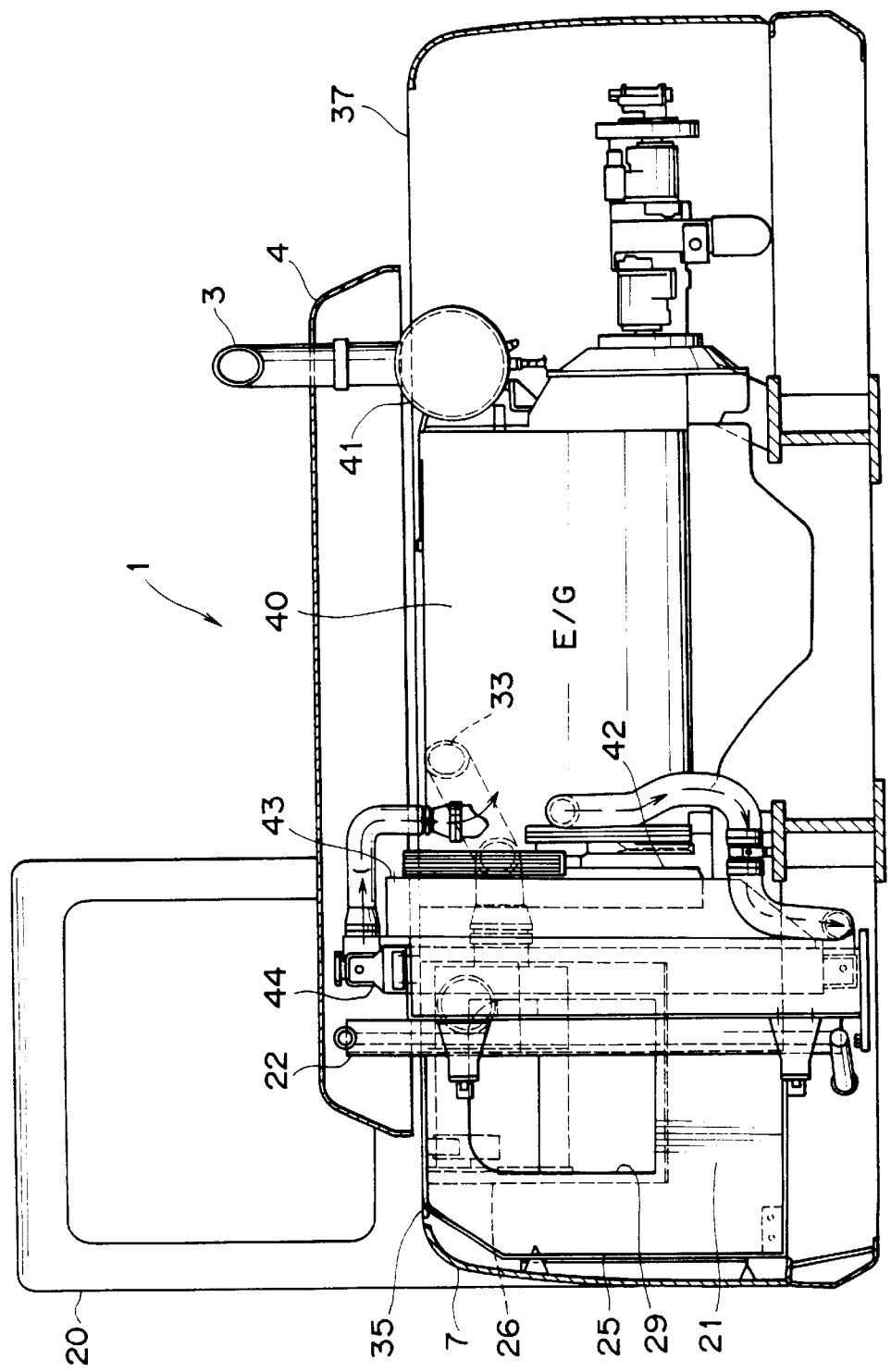
FIG. 4 is a view as seen along line B—B in FIG. 3.

FIG. 4 is a view as seen along line B—B in FIG. 3. In the same figure, numeral 41 denotes a muffler for discharging exhaust gases after combustion in the engine 40 and for deadening the sound thereof. Numeral 42 denotes a fan which is rotated by the engine 40. Numeral 43 denotes a shroud for the fan 42. Numeral 44 denotes a radiator. Numeral 29 denotes a ventilating hole formed in the partition plate 25.

Figure 5:
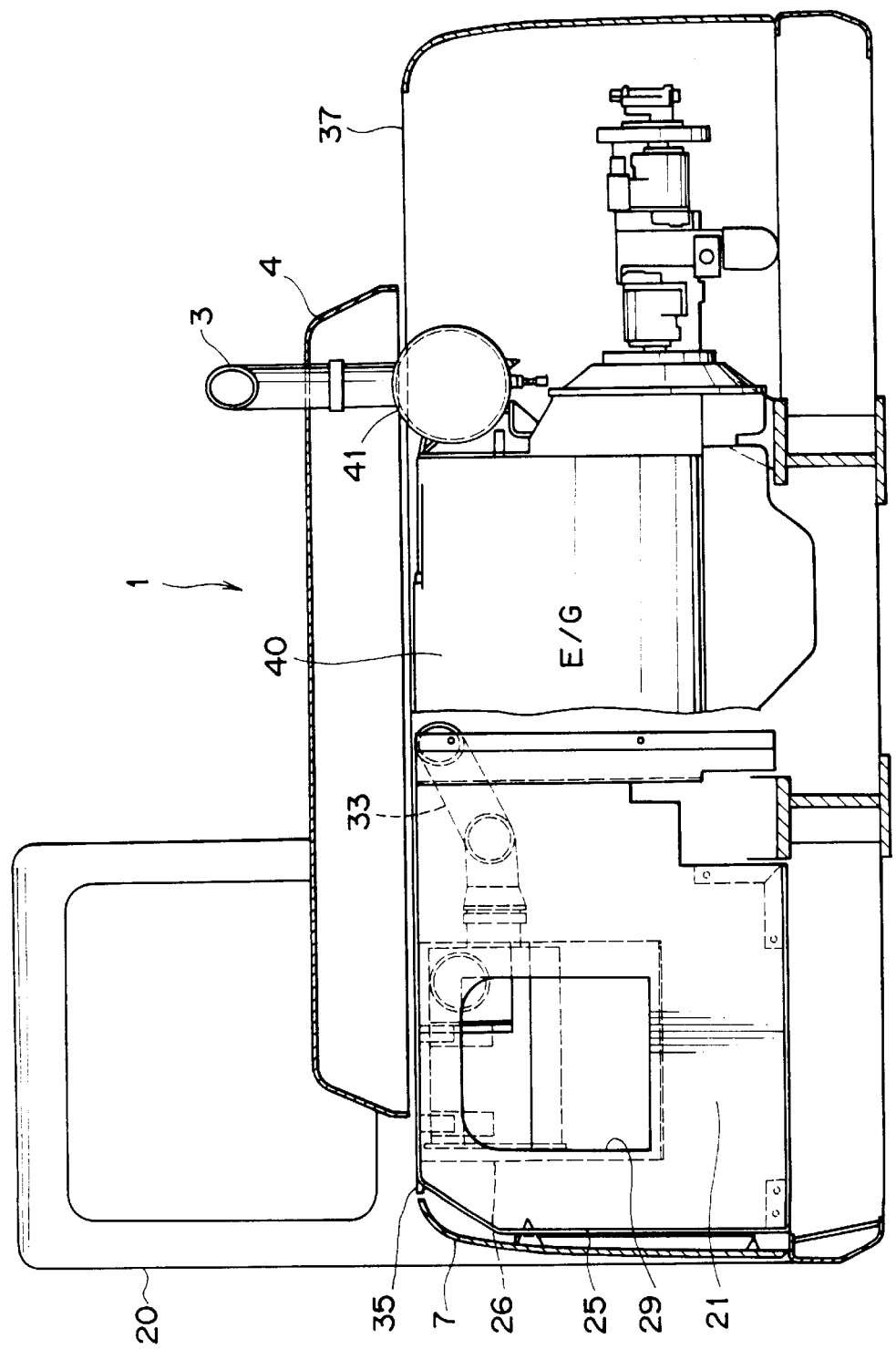
FIG. 5 is a view showing a partition plate with both oil cooler and radiator removed in FIG. 4.

FIG. 5 illustrates the partition plate 25 with the oil cooler 22, radiator 44 and shroud 43 in FIG. 4 removed.

Figure 6:
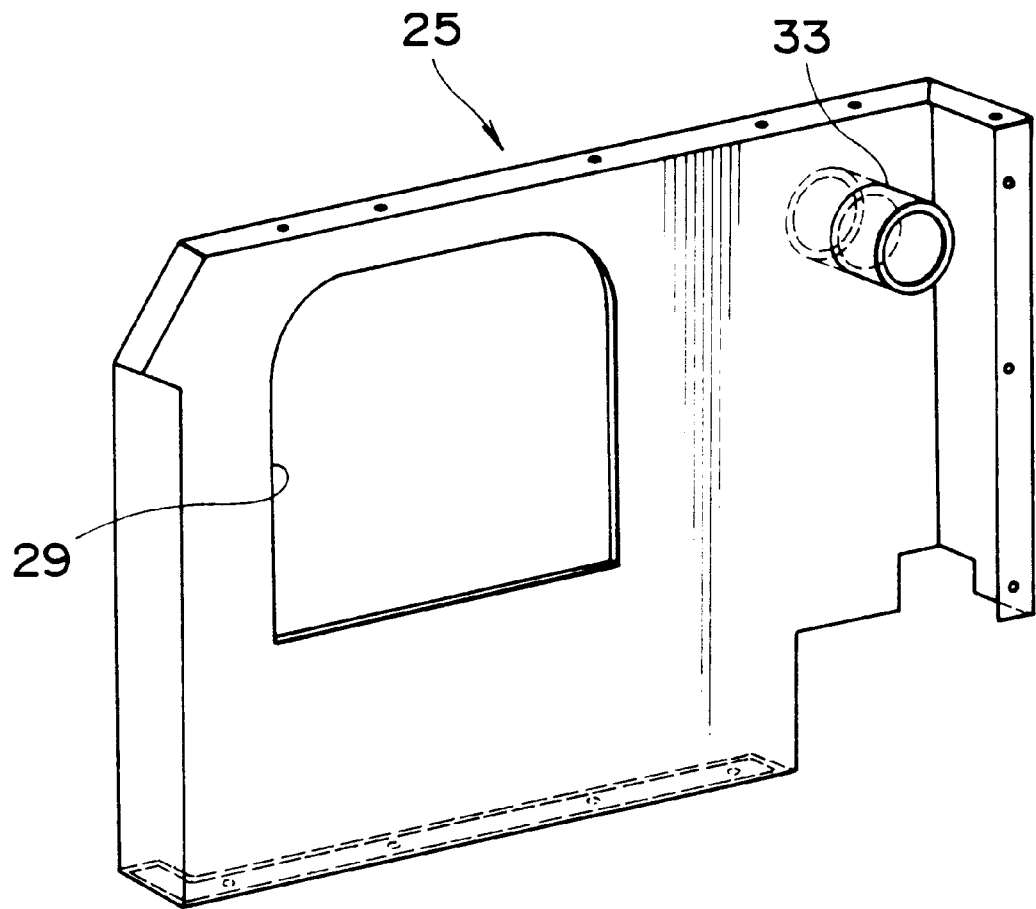
FIG. 6 is a perspective view of the partition plate shown in FIG. 5.

FIG. 6 is a perspective view of the partition plate 25 shown in FIG. 5.

Figure 7:
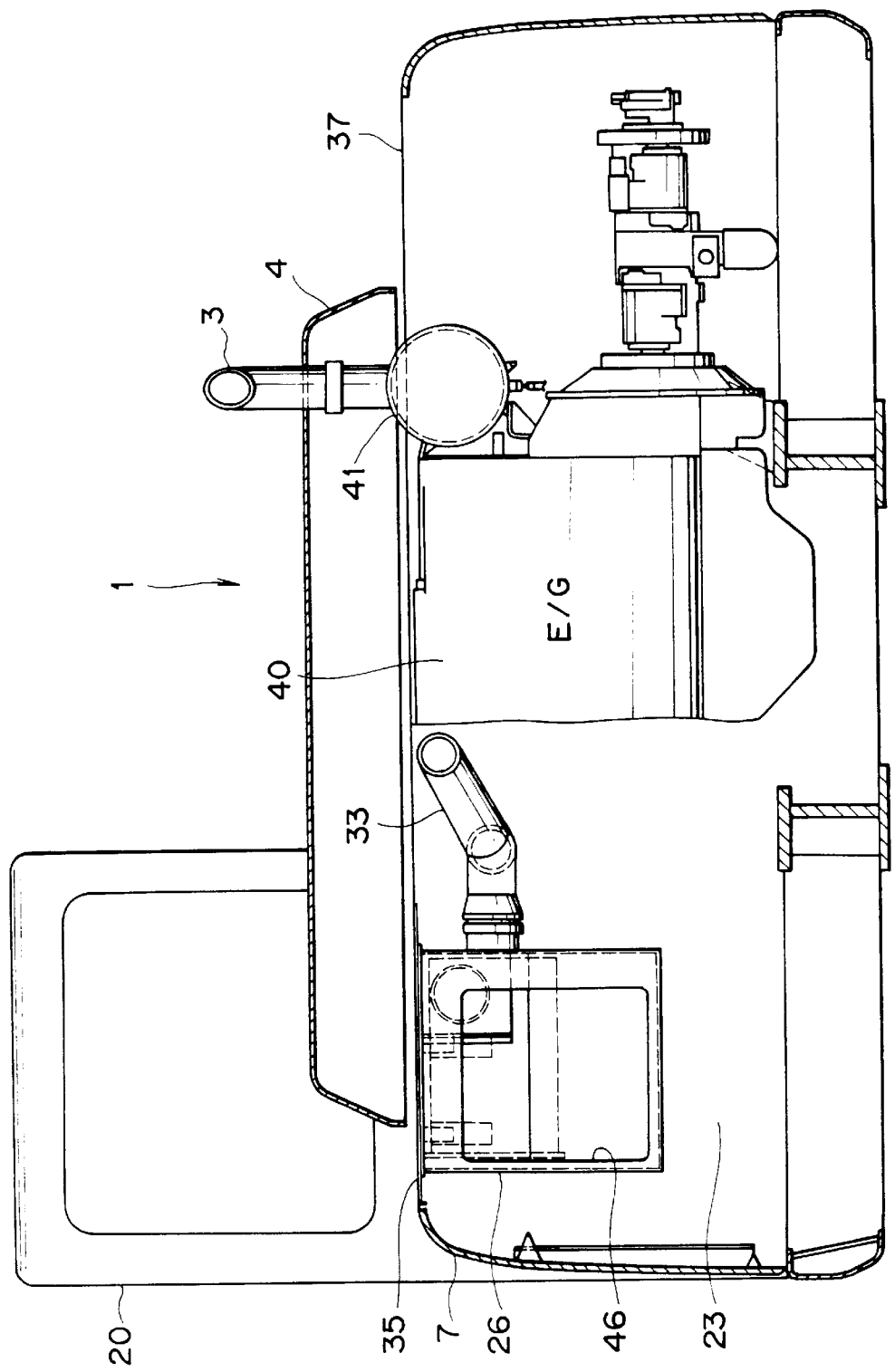
FIG. 7 is a view showing an intake duct with the partition plate in FIG. 5 removed.

FIG. 7 illustrates the intake duct 26 with the partition plate 25 in FIG. 5 removed. In the same figure, numeral 46 denotes a ventilating hole formed in the intake duct 26.

Figure 8:
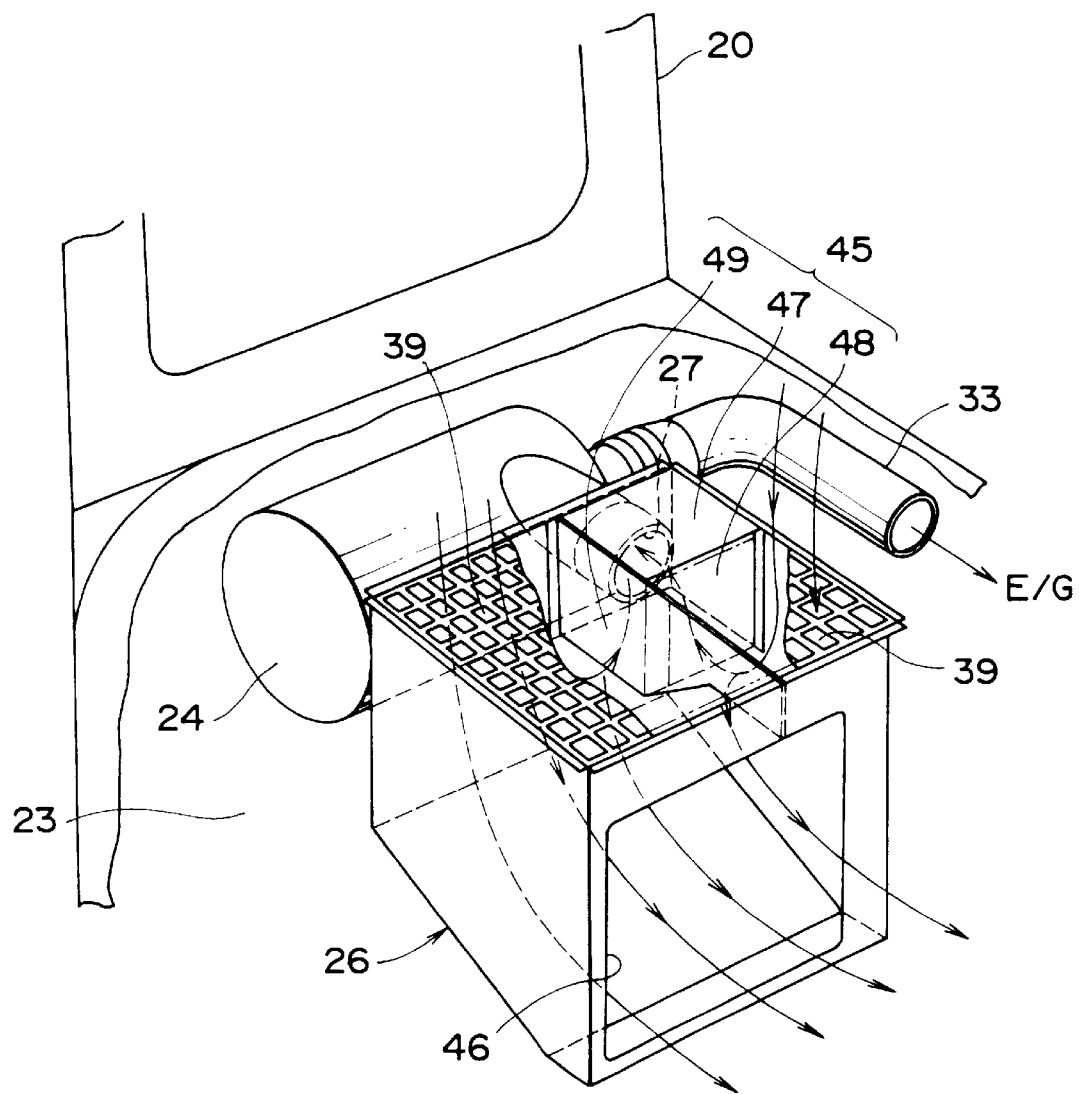
FIG. 8 is a perspective view of the intake duct shown in FIG. 7.

FIG. 8 is a perspective view showing the intake duct 26 illustrated in FIG. 7. In the same figure, numeral 47 denotes a shielding plate for covering from above the intake port 27 which opens to the inside of the intake duct 26. The shielding plate 47 may be formed in a portion above the intake port 27 of the air cleaner ventilating hole 39 or it may be formed above the intake port 27 separately from the air cleaner ventilating hole 39. Numeral 48 denotes a shielding plate which covers the front portion of the intake port 27, numeral 49 denotes a shielding plate which covers the side portion of the intake port 27. Numeral 45 denotes an intake box formed in a box shape so as to be open on only its lower side by shielding plates 47, 48 and 49. The intake port 27 (except the lower side thereof) in the interior of the intake duct 26 is surrounded with the intake box 45.

The air intake structure embodying the invention and the operation thereof will now be described in detail. The air intake structure of this embodiment includes the radiator chamber 21, radiator ventilating holes 34a–34d (shown in FIG. 3) formed in the upper portion of the radiator chamber 21, air cleaner chamber 23 formed in close proximity to the radiator chamber 21, air cleaner ventilating hole 39 formed in the ceiling surface (guard plate 38) of the air cleaner chamber 23, intake duct 26 disposed below the air cleaner ventilating hole 39, and air cleaner 24 disposed in close proximity to the ceiling surface of the air cleaner chamber 23 at a position close to the intake duct 26. The air cleaner 24 sucks therein the outside air through the intake port 27 formed in the intake duct 26. The intake duct 26 is in communication with the radiator chamber 21 through the ventilating hole 46 (shown in FIGS. 7 and 8) and the ventilating hole 29 (shown in FIGS. 5 and 6). With this arrangement, the outside air which has been sucked in from the air cleaner ventilating hole 39 is introduced into both air cleaner 24 and radiator chamber 21 through the intake duct 26. Thus, the radiator chamber 21 has large intake openings which are an opening communicating with the air cleaner ventilating hole 39 plus the radiator ventilating holes 34a–34d opened in the upper portion of the radiator chamber 21, so that the engine cooling efficiency can be enhanced to a satisfactory extent. Besides, since the air cleaner 24 is disposed in close proximity to the ceiling surface of the air cleaner chamber 23 at a position near the intake duct 26, the lower space in the air cleaner chamber 23 can be fully utilized effectively.

In this embodiment, moreover, such the shielding plate 47 as shown in FIG. 8 is disposed above the intake port 27 in the interior of the intake duct 26, whereby it is possible to prevent rain water or the like from being introduced into the air cleaner 24 through the air cleaner ventilating hole 39. Besides, it is possible to reduce the intake noise of air which is sucked in from the intake port 27 of the air cleaner 24.

Thus, the effect of preventing the suction of rain water or the like and reducing the intake noise can be achieved by covering only the portion above the intake port 27 in the interior of the intake duct 26 (by using the shielding plate 47 in this embodiment). In this embodiment, moreover, the box-shaped intake box 45 (shown in FIG. 8) having an opening substantially on only the lower side is formed in the interior of the intake duct 26 by the shielding plates 47, 48 and 49, and the air cleaner 24 sucks therein the outside air through the intake duct 26, intake box 45 and intake port 27. According to this arrangement, not only the suction of rain water or the like into the intake port of the air cleaner can be prevented more surely and even a slanting rain or the like can be prevented from entering said intake port.

Further, the air cleaner 24 is fixed to the guard plate 38 (shown in FIG. 3) which forms not only the ceiling surface of the air cleaner chamber 23 but also an outer facing of the rotating body 1, or to a support member (not shown) which supports the guard plate 38. As a result, the air cleaner 24 can be fixed securely and strongly at an upper position of the air cleaner chamber 23.

We claim:

1. An air intake structure in a construction machine, comprising:

a radiator chamber;

a radiator ventilating hole which is open in an upper position of said radiator chamber;

an air cleaner chamber formed in close proximity to said radiator chamber;

an air cleaner ventilating hole which is open in a ceiling surface of said air cleaner chamber;

an intake duct disposed below said air cleaner ventilating hole and communicating with said radiator chamber; and an air cleaner disposed in close proximity to the ceiling surface of said air cleaner chamber at a position close to said intake duct, said air cleaner introducing the outside air through an intake port formed in said intake duct.

2. An air intake structure in a construction machine according to claim 1, further comprising:

a shielding plate disposed above said intake port in the interior of said intake duct.

3. An air intake structure in a construction machine according to claim 2,
   wherein said air cleaner is fixed to a guard member which forms not only the ceiling surface of said air cleaner chamber but also an outer facing of the construction machine, or to a support member which supports said guard member.

4. An air intake structure in a construction machine according to claim 1, further comprising:
   an intake box formed in the shape of a box which is open substantially on a lower side thereof alone, said intake box surrounding said intake port in the interior of said intake duct, and
   wherein said air cleaner sucks therein the outside air through said intake duct, said intake box and said intake port.

5. An air intake structure in a construction machine according to claim 4,
   wherein said air cleaner is fixed to a guard member which forms not only the ceiling surface of said air cleaner chamber but also an outer facing of the construction machine, or to a support member which supports said guard member.

6. An air intake structure in a construction machine according to claim 1,
   wherein said air cleaner is fixed to a guard member which forms not only the ceiling surface of said air cleaner chamber but also an outer facing of the construction machine, or to a support member which supports said guard member.

* * * * *